May 4, 1926.
P. B. HACKLEY
SCRAPER ATTACHMENT
Filed June 11, 1923
1,583,289
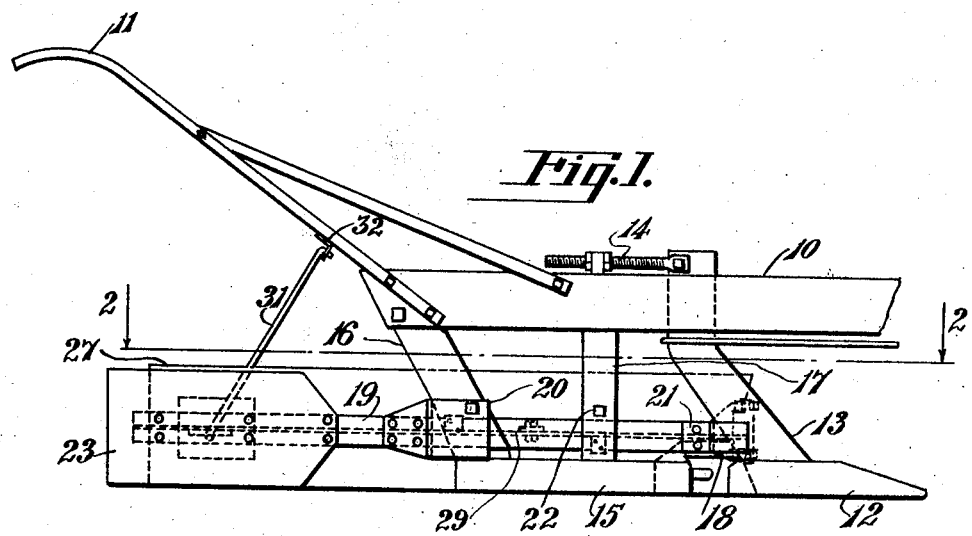
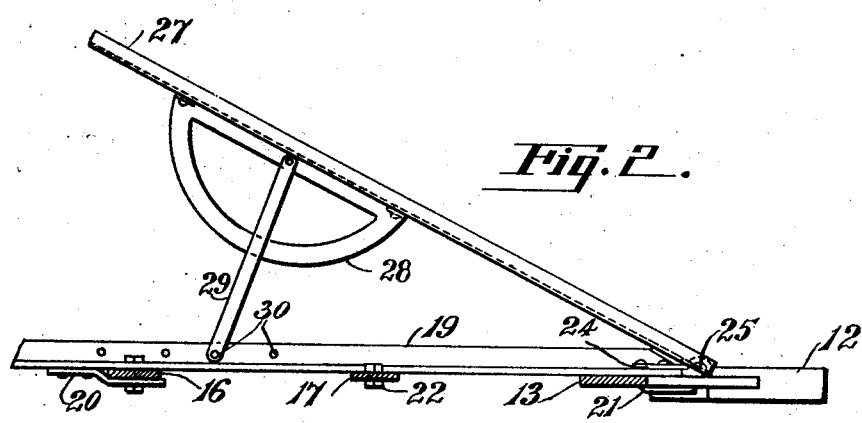
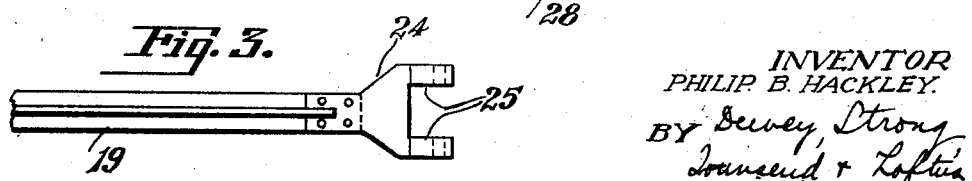
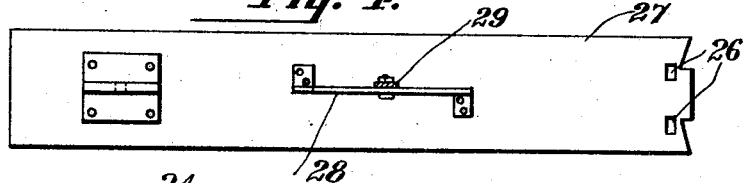
INVENTOR
PHILIP. B. HACKLEY.
BY Dewey, Strong
Townsend & Loftus
ATTORNEYS Patented May 4, 1926.

1,583,289

UNITED STATES PATENT OFFICE.

PHILIP B. HACKLEY, OF BERKELEY, CALIFORNIA.

SCRAPER ATTACHMENT.

Application filed June 11, 1923. Serial No. 644,550.

*To all whom it may concern:*

Be it known that I, PHILIP B. HACKLEY, a citizen of the United States, residing at Berkeley, county of Alameda, and State of California, have invented new and useful Improvements in Scraper Attachments, of which the following is a specification.

This invention relates to scrapers for plows, and has for its object to produce a tool suitable for constructing and maintaining trails in difficult places, and constructing and cleaning out irrigation and drainage ditches and the like.

This object I accomplish by employing a frame having a plow point and a blade or scraper at one side which can be adjusted angularly to throw dirt which has been loosened by the plow point to one side a greater or less distance.

One form which my invention may assume is exemplified in the following description and illustrated in the accompanying drawing, in which—

Fig. 1 shows a side elevation of a plow equipped with my attachment.

Fig. 2 shows a plan view in section, taken on the line 2—2 of Fig. 1.

Fig. 3 shows a side elevation of a portion of the attaching means.

Fig. 4 shows a side elevation of the scraper blade.

The plow includes a beam 10, handles 11 and plow point 12. The plow point is carried upon a colter bar 13 which is adjustable through a screw-threaded rod 14 connected with the beam. Back of the colter bar is a centrally arranged frame including a horizontal bottom member 15 and upright members 16 and 17 connected to the beam, the horizontal member being also connected with the colter bar through a yoke 18. The plow thus far described is similar to the one shown in my co-pending application, Serial Number 632,862, filed April 18th, 1923.

However, in place of the mold board shown in said prior application I have provided a scraper attachment consisting of an anchor bar 19, preferably in the form of a T-bar, arranged at one side of the plow frame and contacting with the colter bar and the upright members 16, 17. To secure the anchor bar in place I provide it with a space plate 20 to embrace the rear frame member 16 and a similar plate 21 to embrace the colter bar 13. The plate 20 is bolted to the upright member 16 and a stud or bolt 22 on the upright member 17 contacts with the upper edge of the T-bar 19 for assisting in keeping the latter in place.

The anchor bar projects to the rear of the plow frame and has a fin or widened rear end, as shown at 23, for contact with the ground. Fixed to the front end of the anchor bar is a plate 24, formed with hooks 25 to enter openings 26 in a scraper blade 27. The scraper blade extends rearwardly and outwardly and has a pivotal movement about the hooks 25. Near the middle of the blade is a segment 28 to which is pivoted a link or bar 29 which in turn connects with the anchor bar at different points thereon, as indicated at 30. Through this link the angle of the scraper blade can be adjusted. At the rear end of the scraper blade is a link 31 which connects adjustably with a cross bar 32 on the handles of the plow and helps to support the rear end of the blade.

In the operation of the device, the dirt loosened by the plow point is moved to one side by the scraper blade, the anchor bar serving through its widened rear end in contact with the ground to prevent the plow from being thrust to one side. The angle of the scraper blade can be quickly and easily varied through changing the point of connection of the link 29 with the anchor bar, thus making it possible to throw the dirt different distances from the plow.

When a plow like this is used for constructing trails the scraper is first set relatively close to the frame of the plow so as to throw the dirt only a short distance, and, as the work progresses, the angle of the scraper blade is widened. The device is used in a similar manner in constructing and cleaning out drainage ditches and the like.

The scraper and anchor bar can be applied to either side of the plow frame simply by inverting them and the work of attaching and detaching the same to the plow frame is comparatively quick and simple, requiring merely the connection of one or two bolts.

Various changes in the construction and arrangement of the several parts herein shown and described may be employed without departing from the spirit of my invention as disclosed in the appended claims.

Having thus described my invention, what I claim and desire to secure by Letters Patent is:

1. A plow including a plow-point, a centrally arranged longitudinally disposed frame extending rearwardly from the plow-point, an anchor plate secured to the centrally arranged frame at the rear end thereof and forming a vertically disposed fin, a scraper blade adapted to be arranged at either side of the centrally arranged frame and pivotally connected at its front end to the same and arranged at an angle to the said frame and means for adjustably connecting the scraper blade with the centrally arranged frame.

2. A plow including a plow-point, a centrally arranged longitudinally disposed frame extending rearwardly from the plow-point and comprising a bottom bar and upright members, an anchor plate secured to the rear end of the bottom bar and arranged to form a vertical fin, a scraper blade adapted to be arranged at either side of the centrally arranged frame and disposed at an angle to the same, fastening means mounted on the bottom bar at the front end thereof for detachably pivoting the front end of the scraper blade to the said frame and adjusting means located in rear of the said fastening means for connecting the scraper blade with the centrally arranged frame.

PHILIP B. HACKLEY.